3,332,734
MODIFICATION OF WOOL WITH ORGANIC CHLOROPHOSPHATE IN THE PRESENCE OF METHYLPYRROLIDONE AND BUTYROLACTONE

Nathan H. Koenig, Berkeley, Calif., assignor to the United States of America as represented by the Secretary of Agriculture
No Drawing. Filed Oct. 29, 1964, Ser. No. 407,587
3 Claims. (Cl. 8—128)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the chemical modification of wool by reacting it with an organic chlorophosphate. Further objects of the invention will be apparent from the following description wherein parts and percentages are by weight unless otherwise specified.

In accordance with the present invention, wool is reacted with an organic chlorophosphate in the presence of a mixture of N-methyl-2-pyrrolidone (hereinafter referred to as methylpyrrolidone) and γ-butyrolactone. The said mixture catalyzes the actual chemical combination of the wool and the chlorophosphate reactant. As a consequence, one is enabled to readily prepare wools containing substantial proportions of combined chlorophosphate with correspondingly improved properties. In contrast, chlorophosphates alone or in the presence of common organic solvents only react slightly with wool so that the degree of modification is low. Moreover, it has been found that when a chlorophosphate is reacted with wool in the presence of a mixture of methylpyrrolidone and γ-butyrolactone, unexpected superior results are attained as compared to the reaction in the presence of either methylpyrrolidone alone or γ-butyrolactone alone. A primary advantage of the invention is that it yields an unexpectedly high degree of modification.

The unusual and effective action of mixtures of methylpyrrollidone and γ-butyrolactone as catalysts for the reaction in question is demonstrated by the following experimental data:

Example I

A series of runs was carried out wherein dry wool flannel was reacted with diphenyl chlorophosphate in the presence of various liquids or mixtures of liquids. In these runs, the weight of dry wool was 1.2 grams, the volume of diphenyl chlorophosphate was 2 ml., the volume of other liquid or mixture of liquids was 4 ml., the reaction time was 90 minutes and the temperature of reaction was 105° C. At the conclusion of the reaction period, unreacted materials were removed by first rubbing the wool under warm acetone and then extracting the fabric with ethanol overnight in a Soxhlet apparatus. The wool was then dried and weighed to determine the percent increase in weight of the wool. The liquid or mixture used and the percent weight increase is tabulated below:

| Run | Liquid or mixture | Increase in weight of wool, percent |
|---|---|---|
| a | Methylpyrrolidone and γ-butyrolactone [1] | 18 |
| b | Methylpyrrolidone and γ-butyrolactone [2] | 16 |
| c | Methylpyrrolidone and xylene [3] | 7 |
| d | Methylpyrrolidone | 10 |
| e | γ-Butyrolactone | 7 |
| f | Butyl acetate | 5 |
| g | Chlorobenzene | 4 |
| h | Xylene | 6 |
| i | None [4] | 5 |

[1] 0.8 ml. methylpyrrolidone, 3 ml. γ-butyrolactone.
[2] 0.7 ml. methylpyrrolidone, 3 ml. γ-butyrolactone.
[3] 1 ml. methylpyrrolidone, 3 ml. xylene.
[4] 6 ml. diphenyl chlorophosphate, no other liquid.

It is apparent from the above data that mixtures of methylpyrrolidone and γ-butyrolactone unexpectedly achieve a substantially higher degree of modification than either liquid alone or any of the other liquids listed. The mixture of methylpyrrolidone and γ-butyrolactone acts not only as a catalyst but also as a swelling medium. The chlorophosphate is thereby enabled to penetrate into the protein molecular structure and react with some of the functional groups. Thus the reaction is one of internal chemical modification and is not restricted to fiber surfaces. Since the process of the invention yields wools of an enhanced degree of modification, it has the practical advantage of yielding products which exhibit greater resistance to deleterious influences or agents such as laundering shrinkage and household bleaches containing sodium hypochlorite. Another advantage of the process is that the improvement is essentially permanent; the treated materials do not lose their new properties after long use or cleaning but retain these properties for the life of the material.

Carrying out the process of the invention essentially involves contacting wool with an organic chlorophosphate in the presence of a mixture of methylpyrrolidone and γ-butyrolactone. The reaction conditions such as proportion of reagent, specific chlorophosphate used, time, temperature, etc. are not critical but may be varied to suit individual circumstances without changing the basic nature of the invention. The temperature of reaction may be about from 50° to 130° C. The reaction rate is increased with increasing temperature and a preferred temperature range to expedite the reaction without damage to the wool is 100–120° C. Generally, the mixture of methylpyrrolidone and γ-butyrolactone is used in a proportion of about from 2 to 5 parts of the mixture per part of chlorophosphate. The relative proportions in the mixture may range, for example, from about 0.1 to about 1 volume of methylpyrrolidone per volume of γ-butyrolactone. It is preferred to carry out the reaction under anhydrous conditions thereby to ensure reaction between the wool and the chlorophosphate. The degree of modification of the wool is related to the proportion of chlorophosphate taken up by the fiber, that is, the higher the uptake of chlorophosphate the greater will be the modification of the wool. In general the uptake of chlorophosphate may be varied from 1 to 20% by weight. In conducting the reaction, the chlorophosphate is generally employed in excess over the amount desired to be taken up by the fibers. The time of reaction will vary depending on such factors as the proportion of methylpyrrolidone and γ-butyrolactone, temperature of reaction, reactivity of the chlorophosphate selected, and the degree of modification desired. In general, the reaction may take anywhere from several minutes to several hours.

After reaction of the wool with the chlorophosphate, the chemically modified wool is preferably treated to remove excess chlorophosphate, reaction by-products, methylpyrrolidone, γ-butyrolactone, and diluent, if such is used. Thus, the wool may be treated as by wringing, passage through squeeze-rolls, centrifugation, or the like to remove the excess materials. In place of such mechanical action, or following it, the product may be extracted with an inert volatile solvent such as trichloroethylene, benzene, acetone, carbon tetrachloride, alcohol, etc. Successive extractions with different solvents may be used to ensure complete removal of all unreacted materials. The treated wool is then dried in the usual way.

Wool modified in accordance with the invention exhibits advantageous properties over normal wool. For example, the modified wool is more resistant to oxidizing conditions. Such conditions may be encountered in textile mills during bleaching, shrinkproofing, or other finishing processes. Oxidizing environments also occur in use by the action of light and air, and in laundering by bleaching chemicals. The increased resistance to oxidizing conditions has been shown by exposing normal and modified wool samples to solutions of sodium hypochlorite, which is used in commercial bleaches.

The tendency of wool to shrink when subjected to washing in aqueous media has long been a deterrent to the more widespread use of wool. An advantage of the invention is that it yields modified wools which have a decreased tendency to shrink when subjected to washing with conventional soap and water or detergent and water formulations.

Although the properties of the modified wool indicate beyond question that actual chemical combination between the chlorophosphate and wool has taken place, it is not known for certain how the chlorophosphate is united with the wool. It is believed, however, that the chlorophosphate reacts with sites in the wool molecule where there are reactive hydrogen atoms—these include such groups as amino, hydroxyl, and thiol. It may be, however, that other reactions occur and I do not intend to limit the invention to any theoretical basis. It is to be noted that the reaction in accordance with the invention does not impair the wool fiber for its intended purpose, that is, for producing woven or knitted textiles, garments, etc.

The process of the invention may be applied to wool in the form of fibers, as such, or in the form of threads, yarns, slivers, knitted or woven goods, felts, etc. The wool textiles may be white or dyed goods and may be of all-wool composition or blends of wool with other textile fibers such as cotton, regenerated cellulose, viscose, animal hair, etc.

The catalytic effect of mixtures of methylpyrrolidone and γ-butyrolactone is not restricted to any particular chlorophosphate or class of chlorophosphates. Consequently the invention may be applied in the reaction of wool with all types of organic chlorophosphates. Particularly preferred are the compounds of the structure

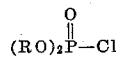

$$(RO)_2\overset{O}{\overset{\|}{P}}-Cl$$

wherein R represents an alkyl or aryl radical. Examples of such compounds coming within the purview of the invention are listed below by way of illustration and not limitation:

dimethyl chlorophosphate,
diethyl chlorophosphate,
di-isopropyl chlorophosphate,
dibutyl chlorophosphate,
dihexyl chlorophosphate,
dioctyl chlorophosphate,
didecyl chlorophosphate,
didodecyl chlorophosphate,
dihexadecyl chlorophosphate,
diphenyl chlorophosphate,
di-p-tolyl chlorophosphate
dixylyl chlorophosphate, and the like.

The invention is demonstrated by Example I, above, and the following examples.

*Example II*

Tests were carried out to determine the resistance of some of the products, prepared in Example I, to attack by sodium hypochlorite solutions.

The hypochlorite resistance test was performed as follows: A 2-cm. length of yarn was removed from the fabric and placed in a 50-ml. beaker containing 20 ml. of 3% aqueous sodium hypochlorite. The liquid was stirred by the rotation of a magnetically-activated bar until the yarn had dissolved, and the elapsed time was noted.

The results tabulated below show the increased resistance to sodium hypochlorite of wool modified in accordance with the invention.

| Run (Example I) | Medium used in modifying wool | Time to dissolve yarn in hypochlorite, min. |
|---|---|---|
| a | Methylpyrrolidone and γ-butyrolactone | 42 |
| d | Methylpyrrolidone | 22 |
| e | γ-Butyrolactone | 7 |
| f | Butyl acetate | 7 |
| g | Chlorobenzene | 5 |
| h | Xylene | 5 |
| i | None | 2 |
| Blank | (Untreated wool) | 3 |

*Example III*

Tests were carried out to determine the improvement in shrinkage characteristics of some of the modified wools prepared in Example I. The shrinkage tests were carried out as follows: The wool samples were milled at 1700 r.p.m. for 6 minutes at 40–42° C. in an "Accelerotor" with 0.9% sodium oleate solution, using a liquor to wool ratio of 50 to 1. After this washing operation, the samples were measured to determine their area. The improvement in shrinkage properties of wool modified in accordance with the invention is demonstrated by the following data:

| Run (Example I) | Medium used in modifying wool | Area shrinkage, percent |
|---|---|---|
| a | Methylpyrrolidone and γ-butyrolactone | 0 |
| b | Methylpyrrolidone and γ-butyrolactone | 0 |
| Blank | (Untreated wool) | 45 |

*Example IV*

A 1.2 gram sample of dry wool flannel was treated with 2.0 ml. of di-p-tolyl chlorophosphate, 0.7 ml. of methylpyrrolidone, and 3.0 ml. of γ-butyrolactone for 2 hours at 105° C. The wool was extracted as in Example I and dried. The uptake of ditolyl chlorophosphate by the wool was 18%. A sample of the product was then tested for resistance to sodium hypochlorite according to the procedure of Example II. It required 45 minutes to dissolve the yarn.

Having thus described the invention, I claim:
1. A process for chemically modifying wool which comprises reacting wool under essentially anhydrous conditions in the presence of a mixture of methylpyrrolidone and γ-butyrolactone with an organic chlorophosphate of the structure

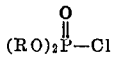

wherein R is a member of the group consisting of alkyl and aryl radicals.

2. The process of claim 1 wherein the chlorophosphate is diphenyl chlorophosphate.

3. The process of claim 1 wherein the chlorophosphate is ditolyl chlorophosphate.

References Cited

UNITED STATES PATENTS

| | | | |
|---|---|---|---|
| 2,809,941 | 10/1957 | Reeves et al. | 8—128 X |
| 2,814,573 | 11/1957 | Reeves et al. | 8—127.6 X |
| 3,110,542 | 11/1963 | Koenig | 8—128 |
| 3,110,543 | 11/1963 | Koenig et al. | 8—128 |

NORMAN G. TORCHIN, *Primary Examiner.*

J. C. CANNON, *Assistant Examiner.*